United States Patent
van der Lely et al.

(10) Patent No.: US 6,170,434 B1
(45) Date of Patent: Jan. 9, 2001

(54) METHOD OF AND AN IMPLEMENT FOR MILKING AND/OR TREATING ANIMALS

(75) Inventors: Alexander van der Lely, Rotterdam; Karel van den Berg, Bleskensgraaf; Franciscus Johannes Adrianus de Groen, Hellevoetsluis, all of (NL)

(73) Assignee: Maasland N.V. (NL)

( * ) Notice: Under 35 U.S.C. 154(b), the term of this patent shall be extended for 0 days.

(21) Appl. No.: 09/274,924

(22) Filed: Mar. 23, 1999

(30) Foreign Application Priority Data

Mar. 23, 1998 (NL) .................................................. 1008672

(51) Int. Cl.$^7$ ..................................................... A01J 5/007
(52) U.S. Cl. .......................................................... 119/14.02
(58) Field of Search ............................. 119/14.01, 14.02, 119/14.03, 14.08, 14.14

(56) References Cited

U.S. PATENT DOCUMENTS

| | | | |
|---|---|---|---|
| 4,247,758 | * 1/1981 | Rodrian | 119/14.08 |
| 4,493,290 | * 1/1985 | Gibbard | 119/51.02 |
| 4,538,634 | * 9/1985 | Seaborne | 119/14.29 |
| 4,618,861 | * 10/1986 | Gettens et al. | 119/14.29 |
| 4,977,856 | * 12/1990 | Norwood | 119/14.03 |
| 5,195,455 | * 3/1993 | van der Lely et al. | 119/14.03 |
| 5,419,280 | * 5/1995 | Musha et al. | 119/14.28 |
| 5,483,921 | * 1/1996 | Waybright | 119/14.02 |
| 5,722,343 | * 3/1998 | Aurik | 119/14.02 |

* cited by examiner

*Primary Examiner*—Thomas Price
(74) *Attorney, Agent, or Firm*—Penrose Lucas Albright

(57) ABSTRACT

A method of and apparatus for automatic milking of animals which comprises a number of steps such as cleaning the animal's teats, connecting teat receiving cups to the animal, foremilking, the milking operation as such, stripping, disconnecting the teat cups and disinfecting the teats. For each step, there are at least two variants. With the same animal, during a milking operation or in successive milking operations, different variants are applied, the variants being selected randomly by a random generator or to change periodically. The variants include the intensity and how the cleaning members are applied to the animal's teats, the sequence in which the teat cups are connected to the animal's teats, the locations of kinking places in the liner of the teat cup, the pulsation frequency, the release-suction phase ratio of pulsation, and the force with which the teat cups are decoupled from the animal's teats at the end of the milking operation.

33 Claims, No Drawings

METHOD OF AND AN IMPLEMENT FOR MILKING AND/OR TREATING ANIMALS

FIELD OF THE INVENTION

The invention relates to an apparatus and method of automated milking or treating or both of animals.

BACKGROUND OF THE INVENTION

Known methods and apparatus which relates to animals when being milked or treated are always approached according to fixed patterns.

The invention aims to provide a method and apparatus wherein the animals receive an additional stimulation during milking or when being treated or both, whereby milking or treating or both are pleasurable to the animals so that an increased milk is to be expected.

SUMMARY OF THE INVENTION

According to the invention this is achieved in a method in which at least one step in the milking or treating process or in both, such as cleaning the teats, foremilking, milking, stripping, disinfecting the teats etc., at least two variants are provided for at least one step. The variant or variants which are selected to be applied are selected at random such as by means of a random generator, or the variants are applied periodically. In this manner the animal is not subjected to a repeated pattern but rather to a changing pattern. It has appeared in practice that, when applying such a method, the animals feel better and consequently produce more milk.

Some animals find it pleasant when one step is carried out periodically. Therefore, according to an inventive feature, for one variant the step is carried out periodically, while for another variant the step is carried out at random.

Therefore, the invention relates to a method of automated milking or treating of animals or both, in which at least two different steps for milking or treating animals or both, such as cleaning the teats, foremilking, milking, stripping, disinfecting the teats, etc., at least one step is carried out in a different sequence or way at random.

According to a further inventive feature, there can also be applied a method in which at least one step is carried out in a different sequence or way periodically.

DETAILED DESCRIPTION OF THE PREFERRED EMBODIMENTS

The milking time of an animal is divided into a period of time and in which for each preferred period of time, a lower and an upper limit value for the pulsation frequency are defined, as well as a release-suction phase ratio for each pulsation cycle for the liner of a teat cup and in which by random selection means such as can be provided by a random generator, a value between numerical values of say 0–100 is selected, which selected value corresponds to a pulsation frequency which is provided for a specific period of time, whereupon said pulsation frequency together with the related release-suction phase ratio are established at random values for that period of time, whereafter the above-mentioned procedure is repeated for the next period of time to produce a different pulsation frequency and phase ratio both randomly selected. The advantage of milking the animals in this manner is that the teat in addition to being stimulated by the pulsation frequency is further stimulated by an alternating, non-predictable release-suction phase ratio, so that a better milk secretion is obtained.

Therefore, the invention also relates to a method of milking animals, or in which the milking time is subdivided into periods of time and in which for each period of time a lower and an upper limit for the pulsation frequency are defined as well as for the release-suction phase ratio for the liner of a teat cup and in which by mean of, for example, a random generator, a value between say 0–100 is selected which value corresponds to a pulsation frequency to be applied for a specific period of time, whereupon said pulsation frequency together with a related release-suction phase ratio are randomly set for that period of time. Thereafter this selection of a random frequency and a random phase ratio is repeated for a next period of time.

It has appeared in practice that, when the lower and upper limit values of the pulsation frequency, in the stimulation phase, the main milking phase and the stripping phase, deviate from each other, these deviations are experienced by the animals as very pleasant.

The invention also relates to an apparatus for milking animals comprising a computer or an electronic pulsator or a random generator or a combination thereof, in which apparatus the above-described method can be applied. According to a further inventive feature, the apparatus comprises a milking robot for automatically connecting teat cups to an animal to be milked. According to again another inventive feature, by means of the random generator, differing sequences are determined and randomly or periodically applied in which the teat cups are connected to the teats of animal to be milked.

The inventive method thus also is directed to varying the order for connecting teat cups to an animal to be milked and arrangements for applying cleaning members for cleaning the teats of an animal, in which method teats cups or cleaning members or both are connected automatically to the teats of an animal by means of milking robot. After the sequence in which the teat cups or the cleaning members or both are applied to the teats of an animal has been determined by means of a random generator, the teat cups or the cleaning members are applied to the teats by means of the milking robot in accordance with the sequence as so determined. In the above-described method the animals are prevented from becoming accustomed to the circumstance that a specific udder quarter for example, is always the first to be milked or that a specific teat is always the first to be cleaned.

After an alternative arrangement in which the teat cups or the cleaning members or both are applied to the teats of an animal is determined by means of a random generator, the teats cups or the cleaning members or both are then applied to the teats by means of the milking robot in accordance with the alternative arrangement so determined.

The cleaning intensity at which cleaning of the animal's teats and udder are cleaned is determined by means of a random generator, and the valve so selected value is set with the aid of adjusting means for adjusting the cleaning intensity. Subsequently the animal's teats or its udder or both are cleaned with a cleaning device which is controlled by the adjusting means to engage the animal's teats or udder or both with the selected intensity.

The inventive cleaning device for cleaning the teats or udder or both of an animal to be milked thus comprises adjusting means with the aid of which the cleaning intensity for engaging the animal is controlled, the cleaning device further being provided with a random generator by means of which a particular cleaning intensity is selected at random. Such intensity is then applied by the cleaning device in accordance with the above-described method. The cleaning device comprises a cleaning member having surface with which cleaning is effected, which cleaning surface is profiled or treated or both in such a manner that cleaning can be effected at different degrees of intensity. In this manner it is possible not only to stimulate the teat to secrete milk quickly, but a lower cleaning intensity can be selected to clean sensitive teats. In a preferred embodiment of the invention, the cleaning members comprise two drivable cleaning rollers between which a teat is received and cleaned. According to a further inventive feature, the cleaning rollers are provided with a plurality of recesses varying in diameter and located beside each other, between which a teat can be cleaned. Teats of different diameter can thus be cleaned without the risk of constriction. According to a further aspect of the invention, the number of revolutions at which the cleaning rollers are driven is determined at random by means of a random generator and applied with the aid of adjusting means.

The force, with which a teat cup is pulled during milking of an animal is controlled to be between a lower and an upper limit value which is selected at random by means of a random generator. Thus, by means of said selected force a withdrawal member disconnects the teat cup from the animal's teat at the completion of the milking process. The invention also relates to a method in which the estimated milking time is subdivided into periods of time and in which, for each period of time, a new value is randomly determined for the force that the teat cup is pulled by the withdrawance by the withdrawal member.

The withdrawal member is provided with a withdrawal element, such as a cord, by means of which the apparatus which carries out the above-mentioned method can be applied. The apparatus also comprises a milking robot for automatically connecting the teat cups to the teats of an animal to be milked and disconnecting same therefrom.

The above-mentioned settings or values or both which are determined at random are defined and recorded in an animal-dependent manner.

The invention relates to a method of milking a teat of an animal, characterized in that with the aid of means the position of a kinking place in a liner of a teat cup is altered during squeezing of the liner. By utilization of the kinking place control means the positions of said kinking places are altered periodically or at random.

The teat cup, which is connectable to a milk line, is provided with a flexible deformable liner which is adapted to be alternately squeezed and reopened by means of changes in pressure applied from a pulsation line connected to the teat cup. The milking member is provided with means for influencing positions on the circumference of the liner that kinking places are formed in the liner when it is squeezed. Control means are provided to prevent said kinking places from being formed each time at the same spots and to alter said positions. Kinking control means are also adapted to change said positions at random.

The invention further relates to a milking robot for automatically connecting teat cups to the teats of an animal to be milked and milking this animal, by means of which milking robot the above described methods can be applied.

Although we have disclosed the preferred embodiments of our inventions, it is to be understood that it is capable of other adaption and modifications within the scope of the following claims.

Having disclosed our invention, what we claim as new and to be secured by Letters Patent of the United States of America is:

1. A method of automated milking of animals, which method comprises a number of steps applied to said animal's teats, said steps consisting of at least one of the following steps: cleaning the animal's teats, foremilking, stripping, disinfecting, controlling the vacuum levels in the teat cups, controlling the release-suction phase ratio of the teat cups' pulsations, and disconnecting the teat cups from animals being milked. there being at least two variants for at least one of said steps wherein one of said variants is selected at random and is applied subsequently as a step in the method that said animal is milked.

2. A method in accordance with claim 1, wherein another said variant for at least one of said steps is applied periodically.

3. A method in accordance with claim 1, wherein instead of one variant for at least one of said steps, subsequently another variant step is applied in the method, said another variant step having been selected at random from said at least two variants.

4. A method in accordance with claim 1, wherein a further step comprises automatically connecting teat cups to the teats of an animal by means of a milking robot, the sequence in which said teat cups are connected to said teats of said animal being random having been determined by means of random generating means.

5. A method in accordance with claim 1, wherein said variants for said one step comprise the cleaning intensity at which the cleaning of each teat of the animal being milked is effected, random generating means controlling adjusting means for adjusting said cleaning intensity applied to said teat by said cleaning device.

6. A method in accordance with claim 1, wherein said one step is disconnecting teat cups from the teats of the animal being milked, a flexible member being connected to each said teat cup for effecting said disconnection when, for each teat cup, the corresponding flexible member being pulled to effect said disconnection, and controlling the force that each said flexible member is pulled by random generating means wherein the force applied to pull each said teat cup from an animal's teat is selected at random.

7. A method of automated milking which comprises a plurality of steps, said steps consisting of at least two of the following steps: cleaning the animal's teats, foremilking, stripping, disinfecting, controlling the vacuum levels in the teat cups, controlling the release-suction phase ratio in the teat cups' pulsations and disconnecting the teat cups from the animal being milked which are sequentially applied to the teats of the animal being milked, using predetermined parameters for controlling each of said steps, at least one of said parameters in at least one said step being determined at random.

8. A method of automated milking which comprises a number of steps applied to the teats of an animal being milked, controlling each of said steps by predetermined parameters, at least one of said parameters being variable and applying in successive milkings of said animal variations of said variable parameter periodically.

9. A method in accordance with claim 7, comprising a further step of milking a teat of the animal being milked with a teat cup applied thereto wherein the pulsation frequency of said teat cup is controlled at random at a frequency between predetermined upper and lower frequencies and the release-suction phase ratio of said teat cup is also controlled at a random ratio between predetermined upper and lower ratios, said pulsation frequency and said ratio being randomly changed from time to time while said animals is being milked.

10. A method of milking animals wherein the time that teat cups are applied to the teats of the animal during a milking operation is subdivided into periods of time and for each said period of time a lower and an upper limit value for pulsation frequency of said teat cups are defined and there is also defined for each said period of time a release-suction phase ratio which corresponds to the pulsation frequency for such period of time, said pulsation frequency and said release-suction phase ratio being randomly selected and applied for said period of time, and a further pulsation frequency and release-suction phase ratio being randomly selected being applied for a further successive period of time.

11. A method in accordance with claim 10, wherein said subdivided periods of time comprise the stimulation phase, the main milking phase and the stripping phase, said pulsation frequencies and said release-suction phase ratios being different in each of said phases.

12. An apparatus for milking animals comprising random generating means for varying parameters for controlling teat engaging means applied to an animal being milked by the apparatus.

13. An apparatus in accordance with claim 12, which comprises a milking robot for automatically connecting teat cups to the teats of an animal to be milked.

14. An apparatus in accordance with claim 13, wherein said random generating means determine the sequence in which said teat cups are connected to said teats of an animal to be milked.

15. A method of connecting teat cups to the teats of an animal to be milked comprising robot means and random generating means, said random generating means determining the sequence that said teat cups are connected to said animal's teats.

16. A method of cleaning the teats of an animal to be milked which comprises randomly controlling the cleaning intensity at which said cleaning of the teats is effected by determining said cleaning intensity by random generating means controlling adjusting means for adjusting said cleaning intensity.

17. A cleaning device for cleaning the teats of an animal to be milked which comprises adjusting means for determining cleaning intensity of the device and random generating means that randomly selects said cleaning intensity and controls said adjusting means.

18. A device in accordance with claim 17, which comprises a profile cleaning surface.

19. A device in accordance with claim 18, comprising two drivable cleaning rollers between which a teat of said animal is engaged.

20. A device in accordance with claim 19, wherein said random generating means randomly determines the revolutions per minute at which said cleaning rollers are driven.

21. A method for varying the force with which a teat cup is pulled during milking of an animal which comprises pulling said teat cup with a force which is between upper and lower limits and within said limits, selecting the amount of force pulling on said teat cup at random, said random force being determined by random generator means which controls the amount of said force exerted by a withdrawal member.

22. A method in accordance with claim 21, wherein the estimated milking time is subdivided into periods of time and for each period of time a new random force is applied to provide the pull exerted on said teat cup.

23. An apparatus for varying the force with which a teat cup is pulled from an animal's teat during the milking of said animal, the apparatus comprising a withdrawal element, a teat cup, a flexible member connecting said withdrawal element and said teat cup and random generating means which randomly, within limits, controls the force applied to said flexible member by said withdrawal element to disconnect said teat cup from the teat of the animal being milked.

24. An apparatus in accordance with claim 23, which comprises a milking robot for automatically connecting said teat cup to said teat of said animal.

25. An apparatus in accordance with claim 24, comprising recording means that records the amount of force applied by said withdrawal element for each time said teat cup is removed from the teat of an animal being milked.

26. A method of automated milking which comprises pulsating the liner of a teat cup during the milking operation wherein said liner has a plurality of kinking places, the particular kinking place utilized in the milking operation being altered during the milking operation.

27. A method in accordance with claim 26, wherein the particular kinking place being utilized in the milking operation is altered periodically during the milking operation.

28. A method in accordance with claim 26, wherein the particular kinking place utilized in the milking operation is altered at random as determined by random generating means.

29. An apparatus for milking a teat of an animal which comprises a teat cup having a connection to a milk line, said teat cup including a flexible, deformable liner which is alternately squeezed and reopened by means of a pulsation line which is connectable to said teat cup, said liner having a plurality of kinking places which are formed in said liner when it is squeezed by air pressure received through said pulsation line and which are caused by selection means for selecting the particular kinking place of said liner when it is squeezed by air pressure received from said pulsation line.

30. An apparatus in accordance with claim 29, wherein said selection means prevents said kinking places from being in the same location each time that said liner is squeezed by air from said pulsation line.

31. A milking apparatus in accordance with claim 29, wherein said selection means alters the locations of said kinking places.

32. An apparatus in accordance with claim 31, comprising control means associated with said selection means to control the locations of said kinking places to be altered periodically.

33. An apparatus in accordance with claim 31 comprising random generating means associated with said selection means to alter the locations of said kinking places at random.

* * * * *